(12) United States Patent
Wu

(10) Patent No.: US 11,510,498 B1
(45) Date of Patent: Nov. 29, 2022

(54) GAMING CHAIR WITH A ROTATABLE HOLDER

(71) Applicant: GENOVA INC., Diamond Bar, CA (US)

(72) Inventor: Peng Wu, Shanghai (CN)

(73) Assignee: GENOVA INC., Diamond Bar, CA (US)

( * ) Notice: Subject to any disclaimer, the term of this patent is extended or adjusted under 35 U.S.C. 154(b) by 0 days.

(21) Appl. No.: 17/704,501

(22) Filed: Mar. 25, 2022

(30) Foreign Application Priority Data

Jan. 18, 2022 (CN) .......................... 202210053015.9

(51) Int. Cl.
| | |
|---|---|
| *A47C 7/62* | (2006.01) |
| *F16M 11/12* | (2006.01) |
| *A63F 13/98* | (2014.01) |
| *F16M 11/04* | (2006.01) |

(52) U.S. Cl.
CPC ................ *A47C 7/62* (2013.01); *A63F 13/98* (2014.09); *F16M 11/046* (2013.01); *F16M 11/12* (2013.01); *F16M 2200/027* (2013.01); *F16M 2200/06* (2013.01)

(58) Field of Classification Search
CPC .. A47C 7/62; A47C 7/723; A47C 7/54; A47C 7/541; A47C 7/543; A47C 7/546; A63F 13/98; F16M 11/046; F16M 11/12; F16M 2200/027; F16M 2200/06; A47B 83/02
USPC ..... 248/411.35, 125.1, 125.7, 157, 419, 411, 248/413
See application file for complete search history.

(56) References Cited

U.S. PATENT DOCUMENTS

| | | | | |
|---|---|---|---|---|
| 4,562,987 A | * | 1/1986 | Leeds ................ | F16M 11/2014 248/920 |
| 4,783,036 A | * | 11/1988 | Vossoughi ......... | F16M 11/2092 248/921 |
| 4,932,620 A | * | 6/1990 | Foy ........................ | F16M 11/08 248/276.1 |
| 5,029,941 A | * | 7/1991 | Twisselmann ......... | A61B 90/60 297/344.13 |

(Continued)

*Primary Examiner* — Christopher Garft
(74) *Attorney, Agent, or Firm* — Bayramoglu Law Offices LLC

(57) ABSTRACT

The present invention relates to a gaming chair with a rotatable holder, which includes a backrest, a seat, two armrests, a bracket, and a rotatable holder. The rotatable holder further includes: a holder fixing arm, a vertical column, first cantilever, second cantilever and a clamping unit, wherein one end of the holder fixing arm is fixedly connected to the bottom of the seat of the gaming chair, the other end of the holder fixing arm is fixedly connected to the vertical column, and one end of the first cantilever is rotatably connected with the vertical column through the sliding locking shaft, the other end of the first cantilever is rotatably connected with one end of the second cantilever, and the other end of the second cantilever is rotatably connected with the clamping unit through the rotating support, so the clamping unit is used for clamping mobile devices. The armrest further comprises: an armrest fixing arm, first connector, a rotating arm, second connector and an armrest panel. The present invention can adjust mobile devices to the position most suitable for the user with Multi-DOF, and can adjust the position of the armrest with Multi-DOF.

9 Claims, 10 Drawing Sheets

(56) References Cited

U.S. PATENT DOCUMENTS

| | | | | |
|---|---|---|---|---|
| 5,275,465 A * | 1/1994 | Gulliver | ................... | A47C 7/70 |
| | | | | 74/553 |
| 5,653,499 A * | 8/1997 | Goodall | ................. | A47B 83/02 |
| | | | | 297/173 |
| 6,021,985 A * | 2/2000 | Hahn | ..................... | F16M 13/00 |
| | | | | 248/281.11 |
| 6,409,127 B1 * | 6/2002 | VanderHeide | ..... | A47B 21/0314 |
| | | | | 108/93 |
| 2003/0089830 A1 * | 5/2003 | Loughman | ............. | F16M 11/10 |
| | | | | 248/125.7 |
| 2010/0187372 A1 * | 7/2010 | Smirnov | ................ | F16M 13/02 |
| | | | | 248/118 |
| 2011/0031785 A1 * | 2/2011 | Steenson | ................ | A47C 7/543 |
| | | | | 297/161 |
| 2012/0068504 A1 * | 3/2012 | Ting | ....................... | F16M 13/00 |
| | | | | 297/135 |
| 2014/0077572 A1 * | 3/2014 | Vander Veen | ........... | A47C 7/24 |
| | | | | 297/452.1 |
| 2014/0361584 A1 * | 12/2014 | Boenigk | ................. | A47C 7/62 |
| | | | | 297/173 |
| 2015/0327683 A1 * | 11/2015 | Ross | ...................... | A47C 7/543 |
| | | | | 297/411.32 |
| 2022/0007841 A1 * | 1/2022 | Chen | ...................... | A47C 7/541 |
| 2022/0031077 A1 * | 2/2022 | Chen | ...................... | A47C 7/541 |

\* cited by examiner

GAMING CHAIR WITH A ROTATABLE HOLDER

TECHNICAL FIELD

The invention relates to the technical field of gaming chairs, in particular, to a gaming chair with a rotatable holder.

BACKGROUND

Gaming chair, referred to as E-sports chair. E-sports is an activity in which electronic game competitions reach the "competitive" level. E-sports is an intellectual confrontation between people using electronic equipment as sports equipment. The design of gaming chair conforms to ergonomics, which is convenient for the user's gaming operation and experience. Because some games require a high degree of user energy and sitting for a long time, gaming chair can ensure the user's comfort.

With the increase of user demands, traditional gaming chairs can no longer satisfy users. When a user sits on a gaming chair and operates a tablet computer, a mobile phone, a handheld game console or other mobile devices to play games, the user's arms are easily tired due to supporting the mobile device for a long time. Therefore, there is the need for a gaming chair for users to easily and comfortably operate mobile devices.

SUMMARY

In order to overcome the shortcomings of the prior art, the present invention provides a gaming chair with a rotatable holder.

In order to solve the above-mentioned technical problems, the present invention provides the following technical solutions:

A gaming chair with a rotatable holder, comprising a backrest, a seat, two armrests and a bracket, and is characterized in that it also includes a rotatable holder, and the rotatable holder further comprises a holder fixing arm, a vertical column, first cantilever, second cantilever and clamping unit, wherein:

One end of the holder fixing arm is fixedly connected to the bottom of the seat of the gaming chair, and the other end of the holder fixing arm is fixedly connected to the vertical column;

One end of the first cantilever is rotatably connected to the vertical column through a sliding locking shaft, and the other end of the first cantilever is rotatably connected to one end of the second cantilever;

The other end of the second cantilever is rotatably connected to the clamping unit through a rotating support, and the clamping unit is used for clamping the mobile devices.

Preferably, the sliding locking shaft is configured as a sleeve and a cylindrical shaft radially protruding from the side wall of the sleeve, the sleeve is disposed on and can slide along the vertical column.

Preferably, a limiter is also sleeved on the vertical column, and the limiter is located under the sleeve of the sliding locking shaft to limit the sliding position of the sliding locking shaft along the vertical column.

Preferably, the swivel base comprises first hinged support and second hinged support, and the first hinged support is fixed on the clamping unit and has a first through hole, the second hinged support is rotatably connected with the other end of the second cantilever and has a second through hole, the hinge shaft passes through the first through hole and the second through hole, so that the clamping unit is rotatable around the hinge shaft as compared to the second hinged support.

Preferably, one end of the first cantilever is also rotatably connected to the cylindrical shaft of the sliding locking shaft.

Preferably, between one end of the first cantilever and the cylindrical shaft of the sliding locking shaft, between the other end of the first cantilever and one end of the second cantilever and between the other end of the second cantilever and the rotating support are all rotatably connected by fastening bolts and damping blocks.

Preferably, the mobile devices comprise smart phones, tablet computers and handheld game consoles.

Preferably, the armrest further comprises: an armrest fixing arm, first connector, a rotating arm, second connector and an armrest panel, wherein, One end of the armrest fixing arm is fixedly connected with the back of the backrest, and the other end of the armrest fixing arm is rotatably connected with one end of the rotating arm through the first connector, and the rotating arm can respectively rotate around the first rotating shaft the bolt and the second rotating shaft the bolt;

The other end of the rotating arm is rotatably connected with one end of the second connector, and the second connector can rotate around the third rotating shaft the bolt;

The other end of the second connector is rotatably connected to the armrest panel through the base of the armrest panel, and the armrest panel can rotate around the fourth rotating shaft the bolt;

The armrest panel is movable back and forth.

Preferably, the armrest further has the first adjustment handle, the second adjustment handle and an adjustment button, and the first adjustment handle is used to adjust the rotating arm rotating around the first rotating shaft the bolt and the second rotating shaft the bolt, the second adjustment handle is used to adjust the armrest panel to rotate around the fourth rotating shaft the bolt, and the adjustment button is used to adjust the front and rear movement of the armrest panel.

Preferably, the first adjustment handle and the second adjustment handle are disposed in the housing of the rotating arm, the second connector and the base, the adjustment button is disposed in the housing of the armrest panel, wherein the first handle part of the first adjustment handle and the second handle part of the second adjustment handle are exposed from the opening of the base housing, and the button part of the adjustment button is exposed from the opening of the armrest panel housing, so that the user can operate the adjustment.

The gaming chair with a rotatable holder of the present invention can adjust the mobile device to the most suitable position for the user with Multi-DOF, and can adjust the position of the armrest with Multi-DOF, so that the user can sit on the gaming chair and operate the mobile device conveniently and comfortably. It can effectively reduce the fatigue of the user's arms, and can easily replace the mobile device, bringing a better user experience.

BRIEF DESCRIPTION OF THE DRAWINGS

The invention publication will be described in detail below with reference to the drawings and specific embodiments.

DETAILED EMBODIMENTS

The embodiments of the present invention will be described below with references to the drawings in the specification. It should be noted that the embodiments involved in this specification are not exhaustive, and do not represent the only embodiments of the present invention. The following corresponding examples are only for clearly illustrating the content of the invention publication, and are not intended to limit the embodiments means thereof. For those of ordinary skill in the art, different forms of changes and modifications can be made on the basis of the description of this embodiment. Any obvious changes or modifications that belong to the technical concept and content of the invention publication are also within the scope of protection of the invention publication.

Figure 1:
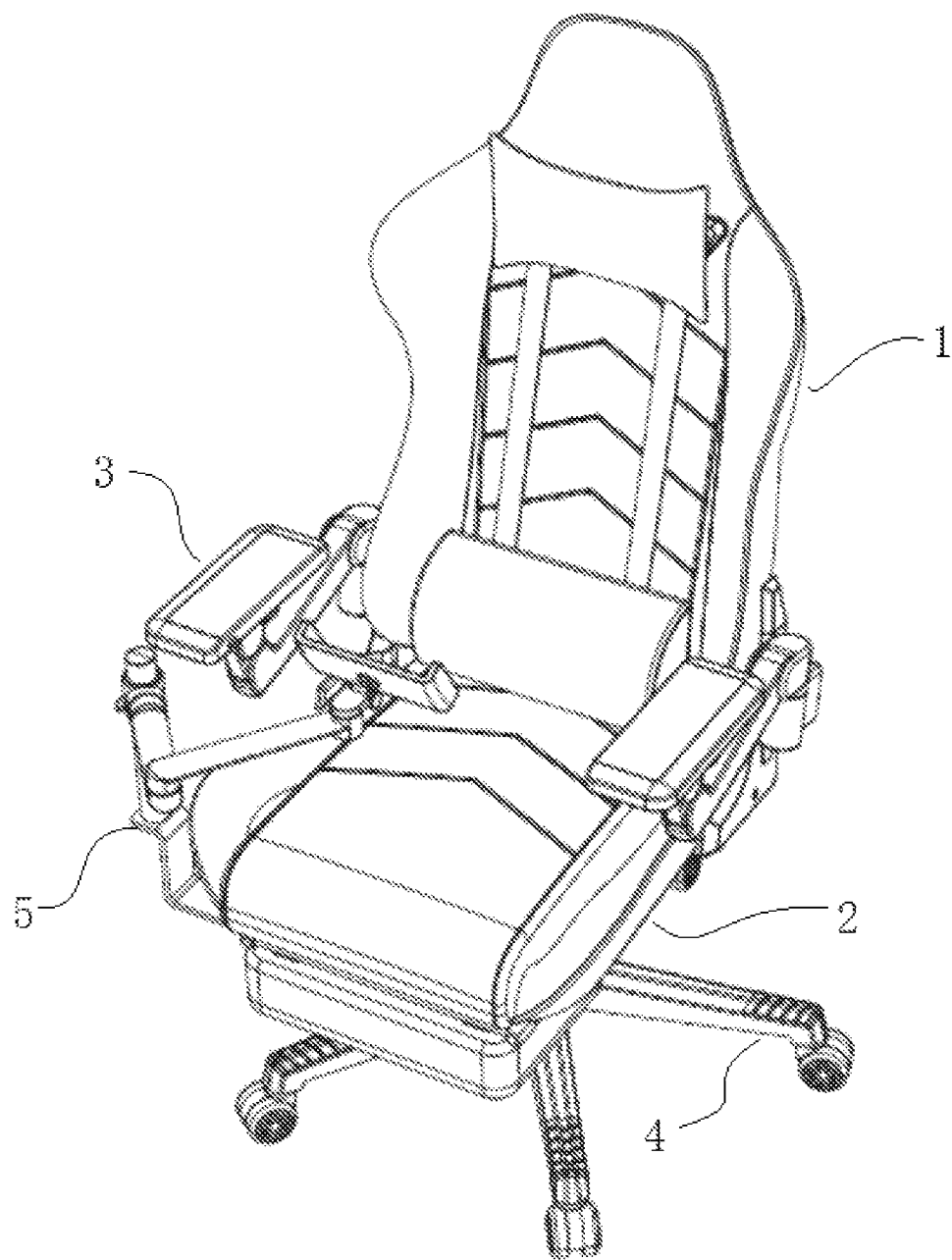
FIG. 1 is a stereogram of the gaming chair with a rotatable holder in an embodiment of the present invention.
Figure 2:
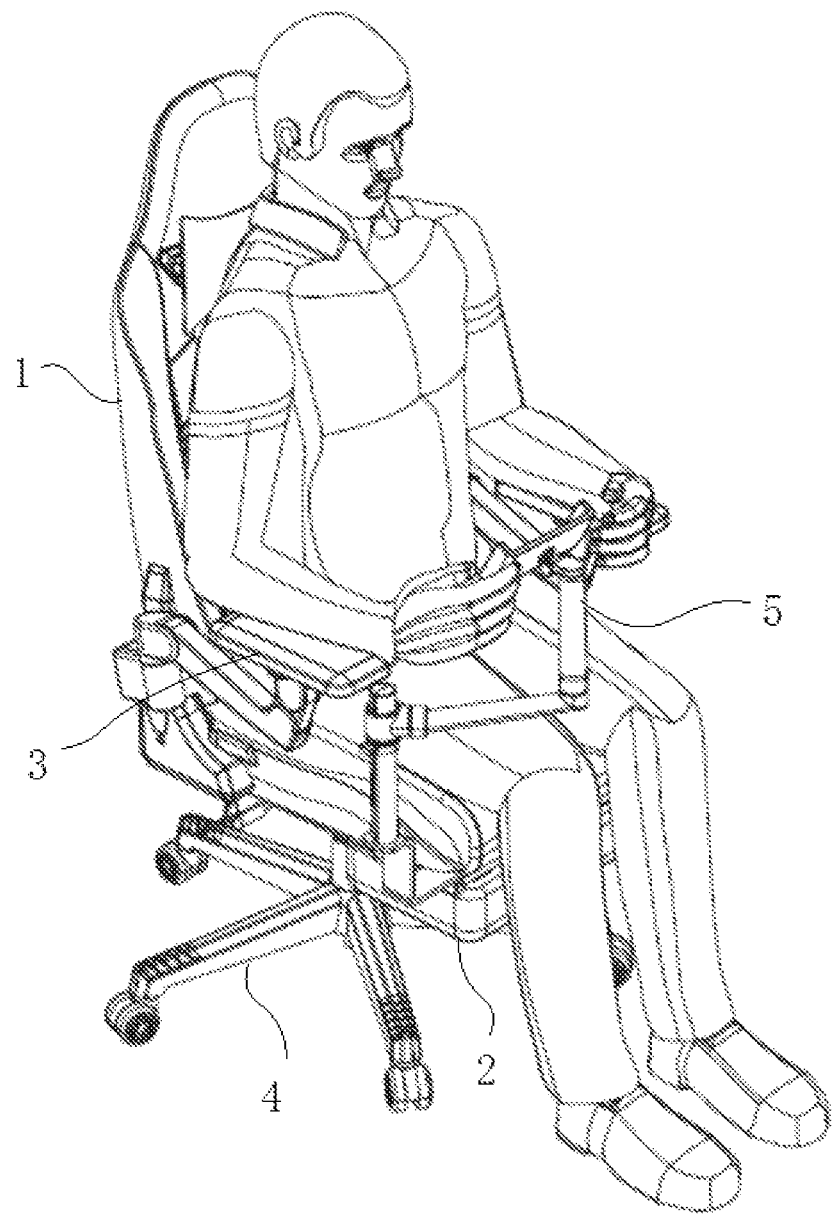
FIG. 2 is a use state diagram of the gaming chair with a rotatable holder in an embodiment of the present invention.

Example:

FIG. 1 is a stereogram of the gaming chair with a rotatable holder in an embodiment of the present invention. The gaming chair includes a backrest 1, a seat 2, two armrests 3, a bracket 4 and a rotatable holder 5. The backrest 1 and the seat 2 are rotatably connected. Armrests 3 are fixedly disposed on both sides of the seat 2. the bracket 4 are disposed under the seat 2. The rotatable holder 5 is fixed on the bottom of the seat 2. The free end of the rotatable holder 5 can hold a mobile device, including a smart phone, a tablet computer or a handheld game console. FIG. 2 is a use state diagram of the gaming chair with a rotatable holder in an embodiment. While sitting on the gaming chair of the present invention, the user can adjust the rotatable holder 5 with Multi-DOF, adjust the mobile device to the position most suitable for the user, and can adjust the position of the armrest 3 with Multi-DOF. It is convenient and comfortable for the user who sits on the gaming chair to operate mobile devices, effectively reducing the fatigue of the user's arms.

Figure 3:
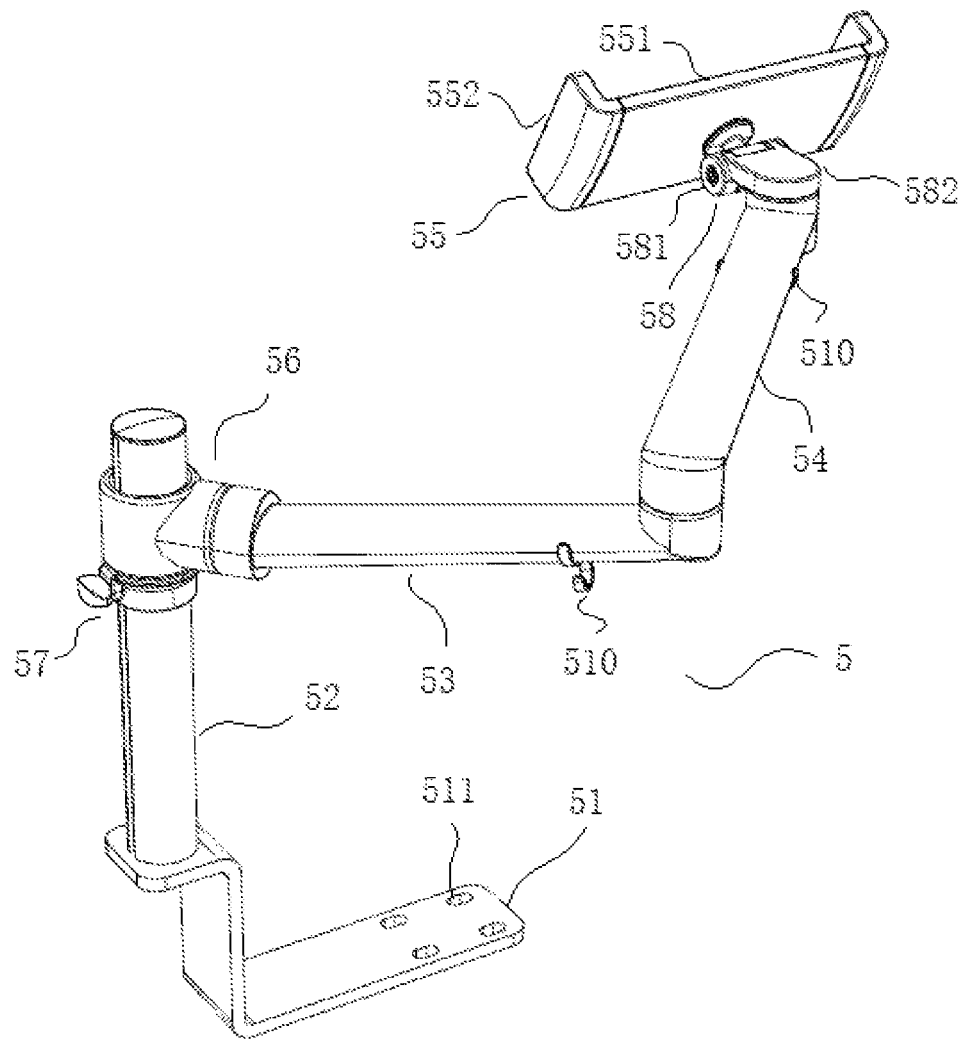
FIG. 3 is a stereogram of the rotatable holder in an embodiment of the present invention.
Figure 4:
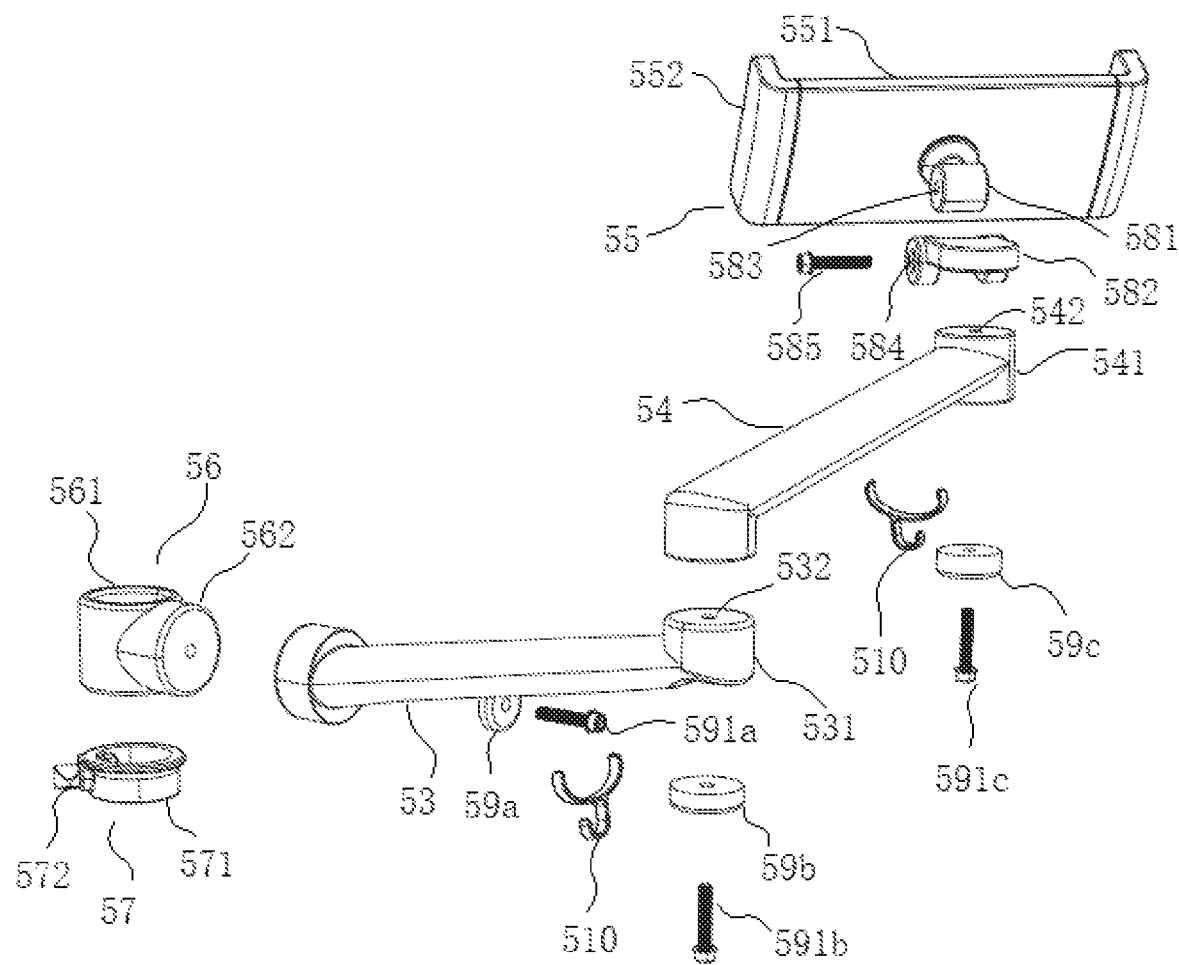
FIG. 4 is a partial exploded view of the rotatable holder in an embodiment of the present invention.
Figure 5:
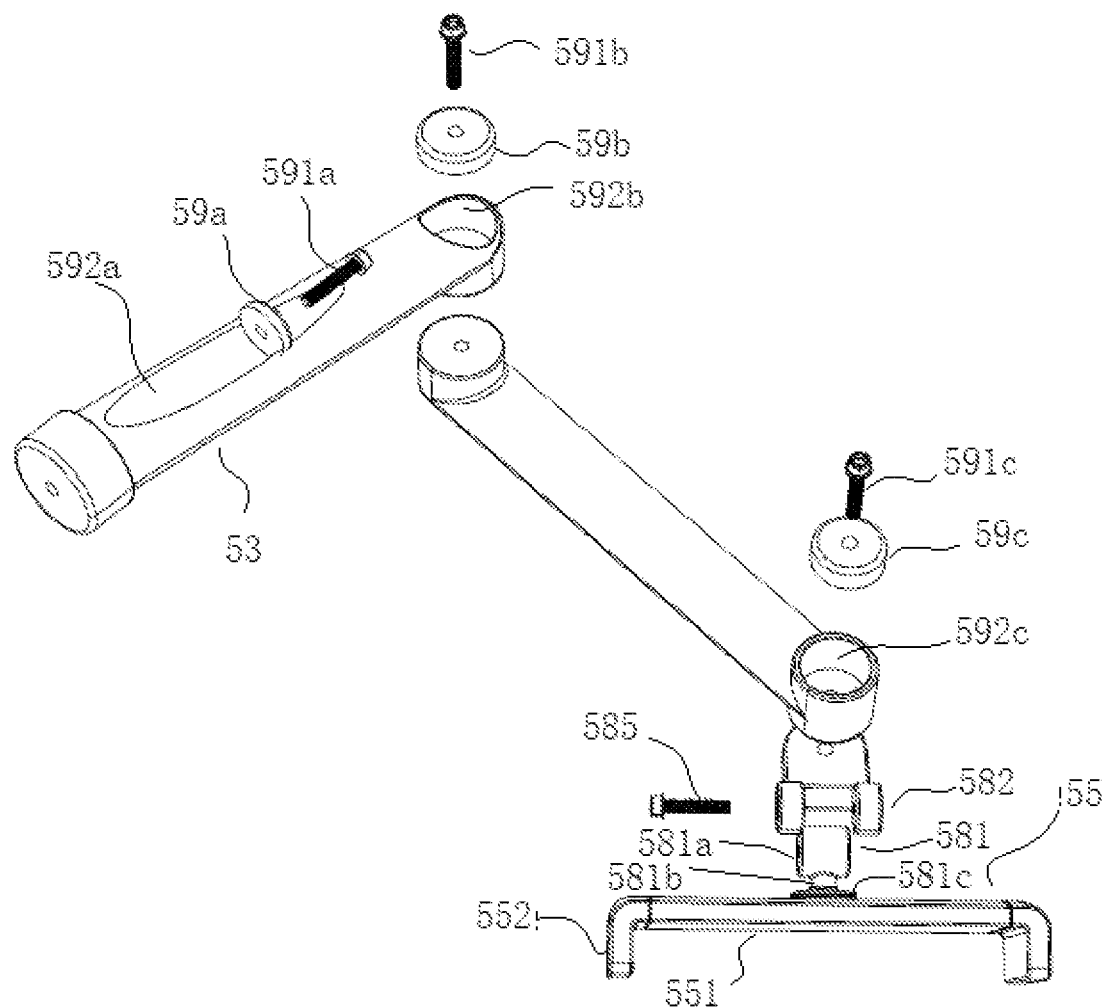
FIG. 5 is a bottom exploded view of the rotatable holder in an embodiment of the present invention.

The structure of the rotatable holder in an embodiment of the present invention will be described in detail below with reference to FIGS. 3-5. In this embodiment, the rotatable holder is used to support the smart phone, which is also referred to as a mobile phone holder hereinafter. As shown in FIGS. 3-5, the mobile phone holder 5 includes: a holder fixing arm 51, a vertical column 52, first cantilever 53, second cantilever 54 and a clamping unit 55. Wherein, one end of the holder fixing arm 51 is fixedly connected to the seat of the gaming chair, and the other end of the holder fixing arm 51 is fixedly connected to the vertical column 52. Specifically, one end of the holder fixing arm 51 is provided with bolt holes 511, which can be fixedly connected to the bottom of the seat by bolts. Preferably, 4 bolts can be used for firmness. The vertical column 52 and the holder fixing arm 51 can be fixedly connected by welding or integral molding.

One end of the first cantilever 53 is rotatably connected to the vertical column 52 through a sliding locking shaft 56, and the other end of the first cantilever 53 is rotatably connected to one end of the second cantilever 54. The sliding locking shaft 56 is configured to have a cylindrical shaft 561 and a cylindrical shaft 562 protruding radially (ie laterally) from the sidewall of the cylindrical shaft 561. The cylindrical shaft 561 is disposed on the vertical column 52 and can slide up and down along the vertical column 52. Through such a structure, the first cantilever 53 is rotatably connected to the vertical column 52, that is, the first cantilever 53 together with the second cantilever 54 and the clamping unit 55 thereon can rotate around the vertical column 52 as a whole. The first cantilever 53 is an arm part extending in the horizontal direction. The second cantilever 54 is an arm part extending in an angled direction as compared to the first cantilever 53.

A limiter 57 is also sleeved on the vertical column 52, and the limiter 57 is located below the cylindrical shaft 561 of the sliding locking shaft 56 to limit the sliding position of the sliding locking shaft 56 along the vertical column 52. Specifically, the limiter 57 is configured to have a collar 571 and an adjustment knob 572, and the adjustment knob 572 is provided with a hole on the collar 571 with which a bolt can pass through. By rotating the adjustment knob 572, the vertical column 52 can be fixed by the collar 571, so that the position of the sliding locking shaft 56 can be limited. By setting the limiter 57, the overall height of the first cantilever 53, the second cantilever 54 and the clamping unit 55 thereon can be easily adjusted.

The other end of the second cantilever 54 is rotatably connected to the clamping unit 55 through the rotating support 58. The rotating support 58 includes the first hinged support 581 and the second hinged support 582. The first hinged support 581 is fixed on the clamping unit 55 and has a first through hole 583. The second hinged support 582 and the other end of the second cantilever 54 are rotatably connected and has two second through holes 584, and the hinge shaft 585 passes through the first through hole 583 and the second through holes 584, so that the clamping unit 55 can rotate around the hinge shaft 585 as compared to the second hinged support 582.

The clamping unit 55 has end parts 552 vertically protruding from both sides of the bottom surface 551 to hold the mobile phone. Preferably, at least one of the two end parts 552 is elastically connected to the bottom surface 551, which can be pulled outwards and has resilience, so that the mobile phone can be easily held. Preferably, the right end part 552 is elastically connected to the bottom surface 551. Specifically, the right side of the bottom surface 551 is configured as a hollow housing, and the end part 552 also has a base part (not shown) extending on the hollow housing part of the bottom surface 551. The base part is elastically connected to the bottom surface 551 within the hollow housing. In addition, the inner side of the two end parts 552 can be disposed or pasted with soft materials preventing the side surface of the mobile phone from being worn. The back of the bottom surface 551 is fixedly connected with the first hinged support 581, for example, by screwing. Specifically, the first hinged support 581 is integrally disposed with a cylindrical shaft 581a, a rod part 581b and a disc base 581c, and has a threaded hole inside, which is threadedly connected to the bottom surface 551 of the clamping unit 55 by screws. The first through hole 583 is provided in the central axial direction of the cylindrical shaft 581a.

Preferably, between one end of the first cantilever 53 and the cylindrical shaft 561 of the sliding locking shaft 56, between the other end of the first cantilever 53 and one end of the second cantilever 54 and between the other end of the second cantilever 54 and the rotating support 58 are rotatably connected by fastening bolts and damping blocks. The damping blocks 59a, 59b, and 59c can be made of nylon and have a through hole in the center. The damping blocks 59a and 59b are respectively disposed in the depressions 592a and 592b at the end of the first cantilever 53, and the damping block 59c is disposed in the depression 592c at the end of the second cantilever 54. Specifically, the fastening bolt 591a passes through the through hole of the damping block 59a and the through hole at one end of the first cantilever 53 and is threadedly connected to the threaded hole on the cylindrical shaft 561, so that one end of the first cantilever 53 is rotatably connected with the sliding locking shaft 56, and one end of the first cantilever 53 can rotate around the central shaft of the cylindrical shaft 561. In addition, as shown in FIGS. 1 and 2, the first cantilever 53 and the central axis of the cylindrical shaft 561 also form a certain angle.

Similarly, the tightening bolt 591 b passes through the through hole of the damping block 59b and the through hole 532 at the other end of the first cantilever 53 and is threadedly connected to the threaded hole at one end of the second cantilever 54, so that the other end of the first cantilever 53 is rotatably connected to one end of the second cantilever 54. The end of the second cantilever 54 can rotate around the central axis of the cylindrical shaft 531 of the first cantilever 53. In addition, as shown in FIGS. 1 and 2, the second cantilever 54 and the central axis of the cylindrical shaft 531 of the first cantilever 53 also form a certain angle. And, the tightening bolt 591c passes through the through hole of the damping block 59c and the through hole 542 at the other end of the second cantilever 54 and is threadedly connected to the threaded hole on the bottom surface of the plane part of the second hinged support 582, so that the other end of the second cantilever 54 is rotatably connected to the plane part of the second hinged support 582, and the second hinged support 582 can rotate horizontally around the central axis of the cylindrical shaft 541 of the second cantilever 54.

Preferably, the cantilever cable hanger 510 is provided on the first cantilever 53 and the second cantilever 54 to facilitate the suspension of cables such as power cords and data transmission cords. The cantilever cable hanger 510 is made of elastic materials, and can be clipped on the cantilever through its own elastic deformation, which is convenient for disassembly and assembly. Moreover, the cantilever cable hanger 510 can be slid along the cantilever to adjust the position of the cantilever cable hanger 510, so as to conveniently adjust and fix the position of the charging cable.

Through the above-mentioned mobile phone holder 5, Multi-DOF can be adjusted to the most suitable position for the user to operate the mobile phone conveniently and comfortably while sitting on the gaming chair, effectively reducing the fatigue of the user's arms, to bring users a better experience.

Figure 6:
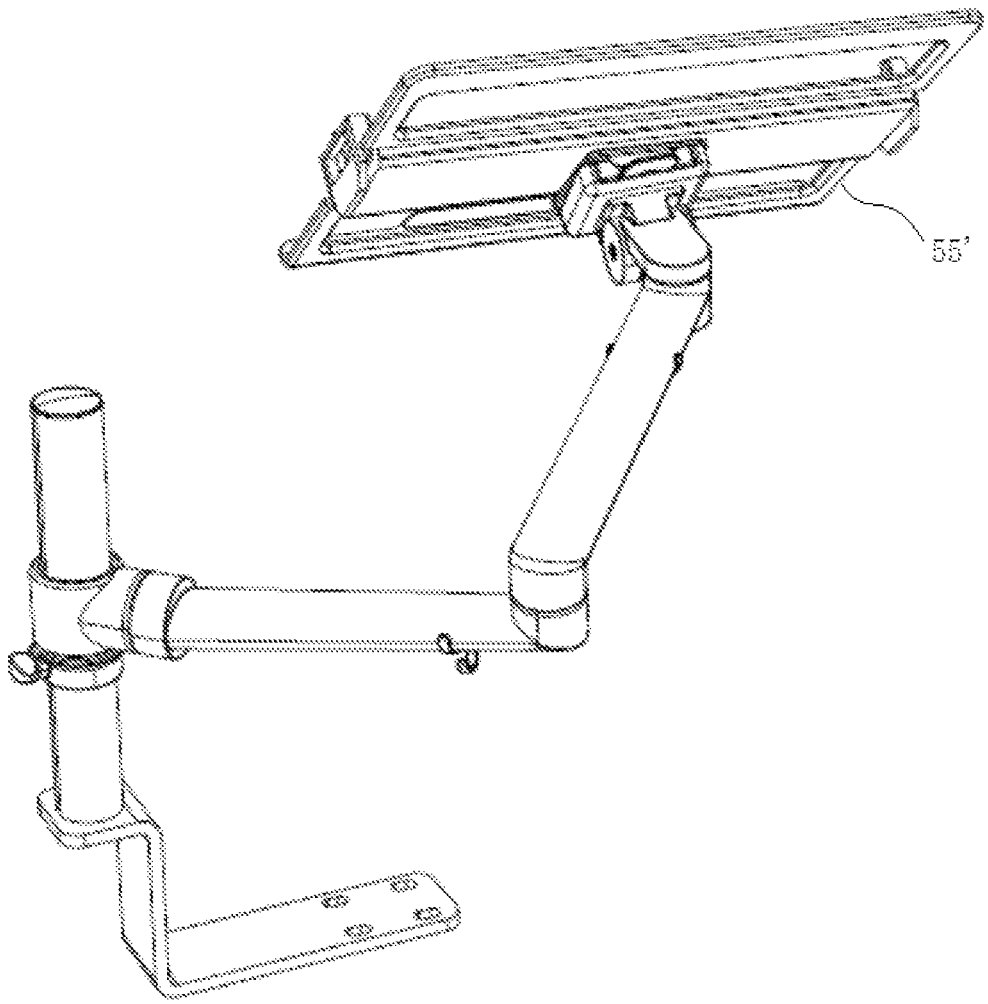
FIG. 6 is a stereogram of the rotatable holder in another embodiment of the present invention.

FIG. 6 is a stereogram of the rotatable holder in another embodiment of the present invention. In this embodiment, the clamping unit 55 on the rotatable holder 5 is used to support the tablet computer. The other aspects are basically the same as the embodiment of the mobile phone holder, which will not be repeated here.

Figure 7:
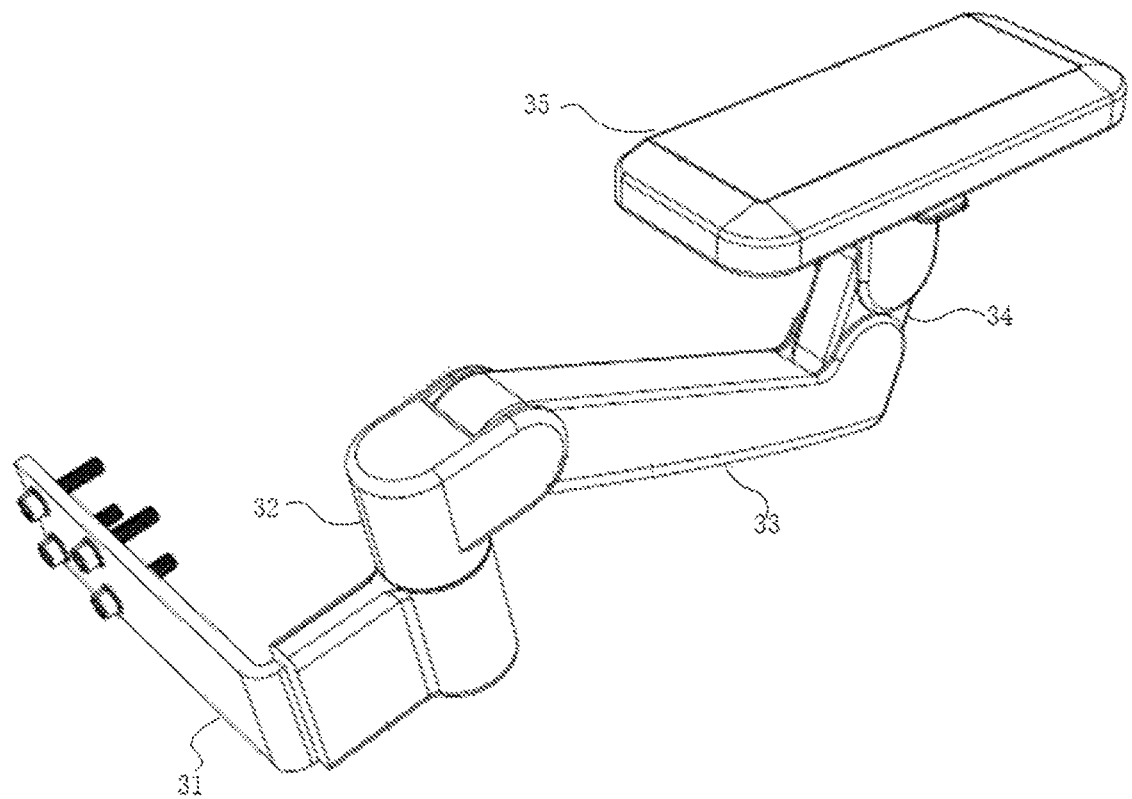
FIG. 7 is a stereogram of the armrest in an embodiment of the present invention.
Figure 8:
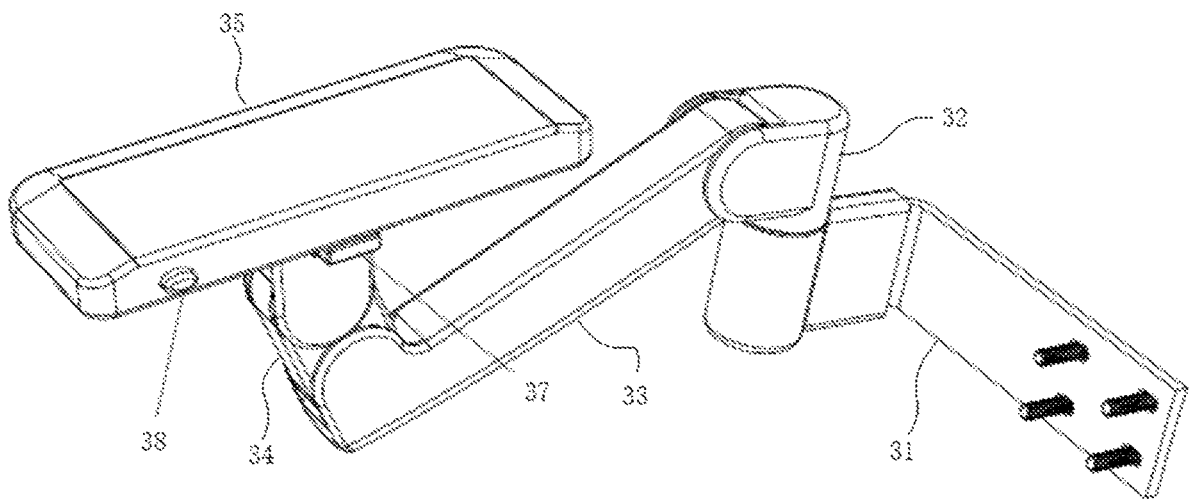
FIG. 8 is another stereogram of the armrest in an embodiment of the present invention.
Figure 9:
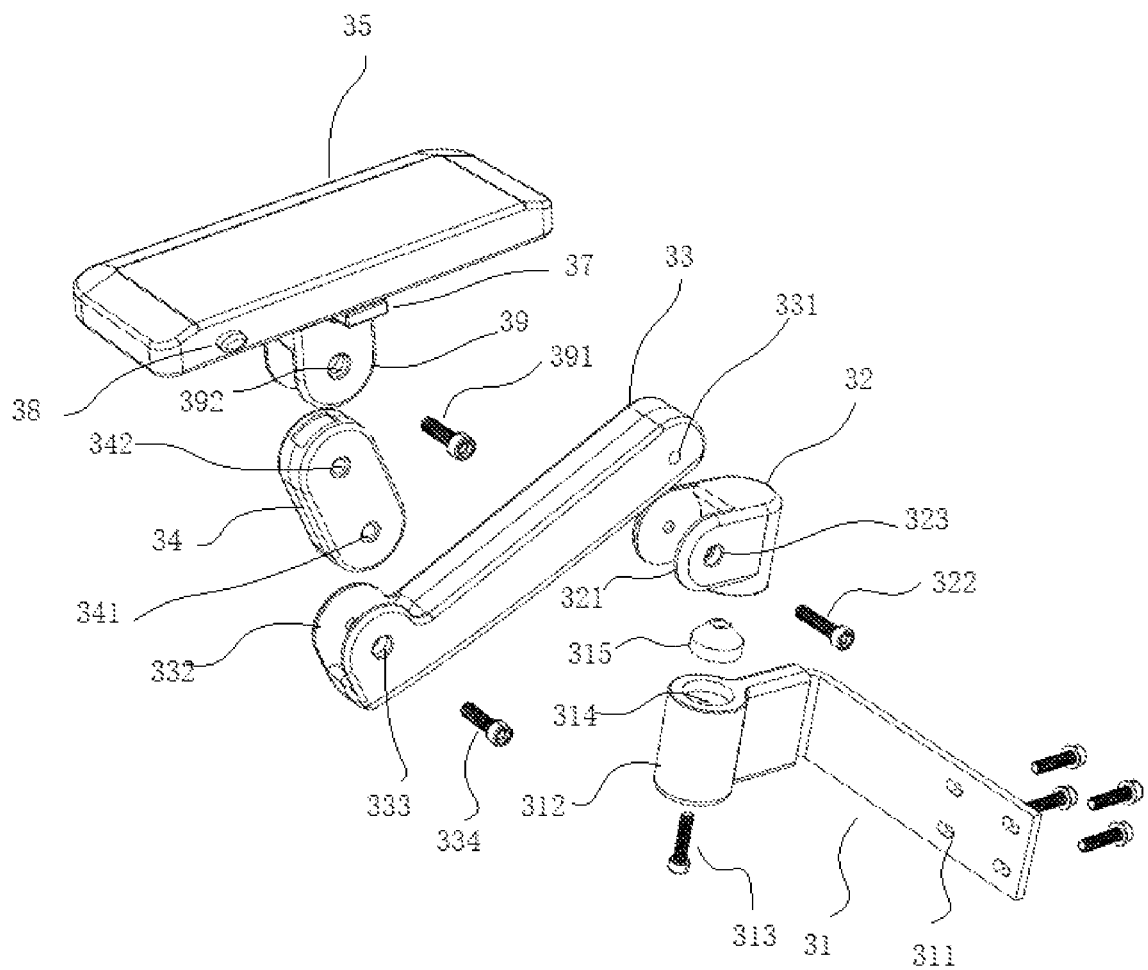
FIG. 9 is an exploded view of the armrest in an embodiment of the present invention.

The structure of the armrest in an embodiment of the present invention will be described in detail below with reference to FIGS. 7-9. FIG. 7 is a stereogram of the armrest in an embodiment of the present invention. FIG. 8 is another stereogram of the armrest in an embodiment of the present invention. FIG. 9 is an exploded view of the armrest in an embodiment of the present invention.

As shown in FIGS. 7-9, the armrest 3 further includes: an armrest fixing arm 31, first connector 32, a rotating arm 33, second connector 34 and an armrest panel 35. Specifically, one end of the armrest fixing arm 31 is fixedly connected to the back of the backrest 1. In this embodiment, the armrest fixing arm 31 is L-shaped, and one end thereof has bolt holes 311, which can be fixedly connected to the back of the backrest 1 by bolts. Preferably, 4 bolts can be used for firmness. The other end of the armrest fixing arm 31 is rotatably connected to one end of the rotating arm 33 through the first connector 32, so that the rotating arm 33 can rotate around the first rotating shaft the bolt 313 and the second rotating shaft the bolt 322 respectively. Preferably, the other end of the armrest fixing arm 31 has a cylindrical part 312, and the first rotating shaft the bolt 313 passes through the axial through hole 314 of the cylindrical part 312 and the damping block 315 and is threadedly connected to the bottom of the first connector 32, so that the first connector 32 can rotate around the first rotating shaft the bolt 313. The first connector 32 is generally cylindrical and radially protrudes from the edge with two ears 321. The center of the ears 321 has through holes 323. The second rotating shaft the bolt 322 is used as a rotating shaft to pass through the through holes 323 of the ears 321 and the through hole 331 at one end of the rotating arm and is threadedly connected to the ears 321, so that the rotating arm 33 can rotate around the second rotating shaft the bolt 322.

The other end of the rotating arm 33 is rotatably connected to one end of the second connector 34, and the second connector 34 can rotate around the third rotating shaft the bolt 334. Specifically, the other end of the rotating arm 33 has two ears 332 protruding vertically from the edge and the arm, the center of the ears 332 has through holes 333, and the third rotating shaft the bolt 334 is used as a rotating shaft to pass through the through holes 333 of the ears 332 and the through hole 341 of the second connector 34 and is threadedly connected with the second connector 34, so that the second connector 34 can rotate around the third rotating shaft the bolt 334.

The other end of the second connector 34 is rotatably connected to the armrest panel 35 through the armrest panel base 39 of the armrest panel 35, and the armrest panel 35 is rotatable around the fourth rotating shaft the bolt 391. Specifically, the other end of the second connector 34 has a through hole 342, and the armrest panel base 39 has the base threaded holes 392. the fourth rotating shaft the bolt 391 is used as a rotating shaft to pass through the base threaded holes 392 and through hole 342, so that the armrest panel 35 and the armrest panel base 39 can rotate around the fourth rotating shaft the bolt 391. It can be seen that the armrest fixing arm 31, the first connector 32, the rotating arm 33, the second connector 34 and the armrest panel base 39 form a four-bar linkage mechanism, so that the position of the armrest panel 35 can be adjusted with Multi-DOF.

In addition, the armrest panel 35 can also slide back and forth in the horizontal direction. Specifically, as shown in FIG. 10, the bottom surface of the armrest panel 35 has two grooves 351, and the armrest panel base 39 has a support piece 393, which can slide in the groove 351, so that the armrest panel 35 can slide back and forth in the horizontal direction.

The armrest 3 also has the first adjustment handle 36, the second adjustment handle 37 and the third adjustment button 38. The first adjustment handle 36 is used to adjust the rotation of the rotating arm 33 around the second rotating shaft the bolt 322. The second adjustment handle 37 is used to adjust the armrest panel 35 to rotate around the fourth rotating shaft the bolt 391, and the third adjustment button 38 is used to adjust the back and forth movement of the armrest panel 35.

A detailed description will be given below with reference to FIGS. 10-11. It should be noted that, although the first adjustment handle 36 and the second adjustment handle 37 are shown separately in FIGS. 10-11, the first adjustment handle 36 and the second adjustment handle 37 are actually both disposed in the housing of the rotating arm 33, the second connector 34 and the armrest panel base 39, only the first handle 361 of the first adjustment handle 36 and the second handle 371 of the second adjustment handle 37 are exposed from the housing of the armrest panel base 39 and are located at the bottom of the armrest panel 35 to facilitate the user to perform adjustment operations.

Figure 10:
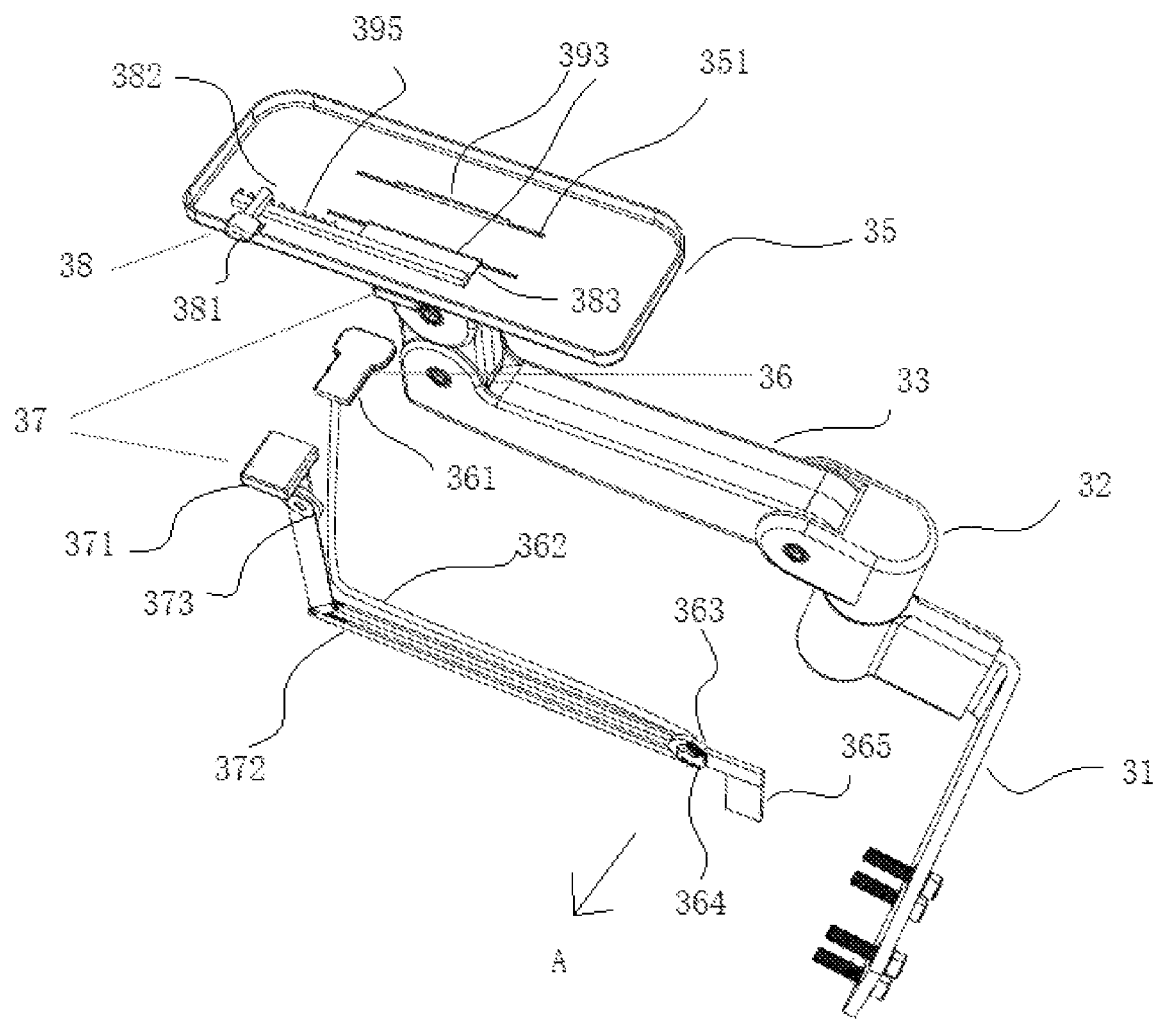
FIG. 10 is an exploded view of the adjustment handle and an adjustment button of the armrest in an embodiment of the present invention.
Figure 11:
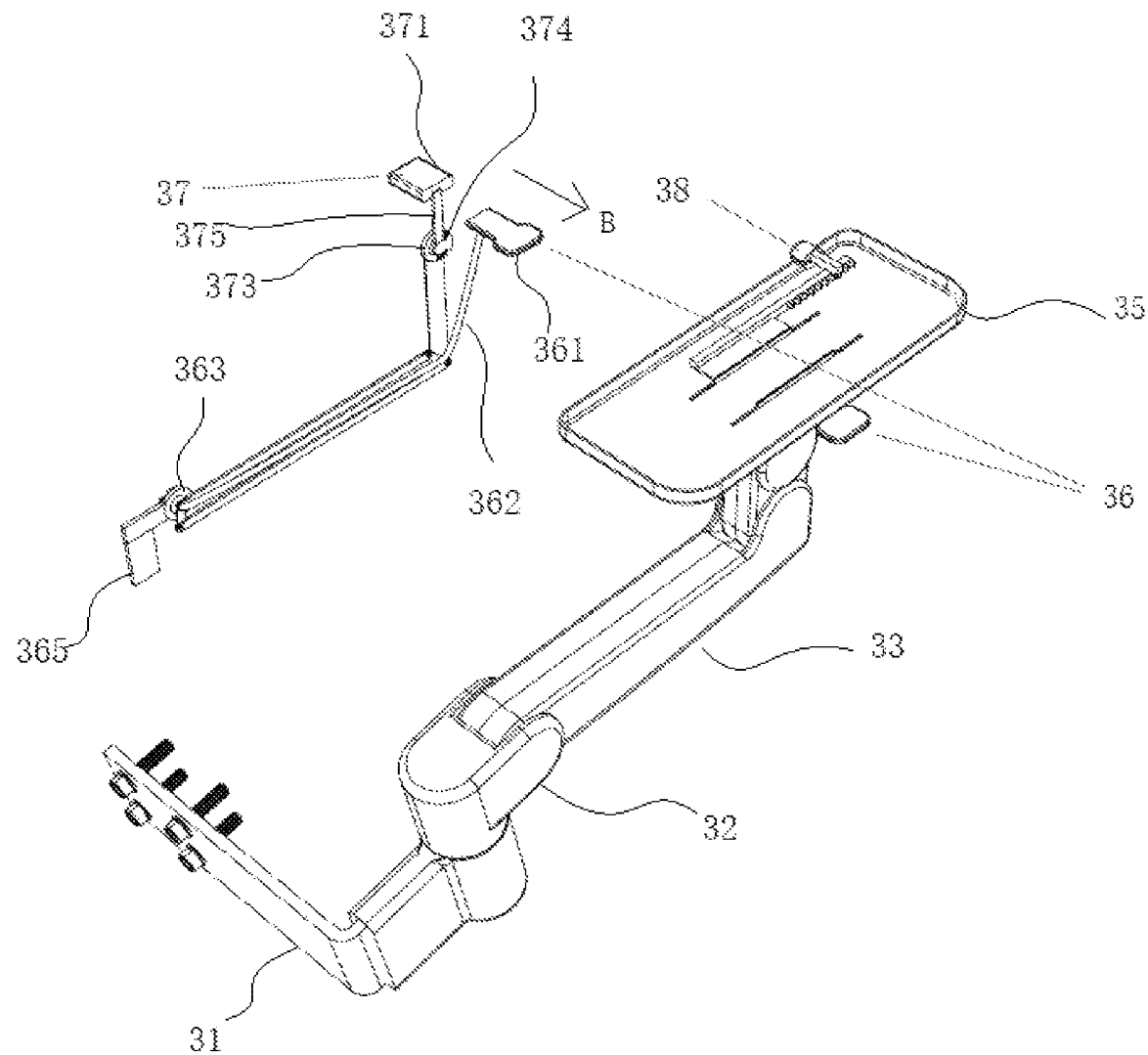
FIG. 11 is another exploded view of the adjustment handle and the adjustment button of the armrest in an embodiment of the present invention.

As shown in FIGS. 10-11, the first adjustment handle 36 has the first handle 361, the first L-shaped rod 362, the first ring gear 363, the first engaging part 364 and a fixing block 365. The first ring gear 363 has gears in partial sector area, and is sleeved on the second rotating shaft the bolt 322 through a central through hole. The first L-shaped rod 362 is connected to the first handle 361 and the first engaging part 364. The first engaging part 364 can be engaged with a gear on the first ring gear 363. One end of the fixing block 365 is fixedly connected with the first ring gear 363, and the other end is fixed in the first connector 32.

In the normal state, when the first engaging part 364 engages with the gear on the first ring gear 363, because the first L-shaped rod 362 is locked, the rotating arm 33 cannot rotate around the second rotating shaft the bolt 322, and when the first handle 361 is pushed toward the armrest panel 35 at horizontal direction, the thrust acts on the first engaging part 364 through the first L-shaped rod 362, so that the first engaging part 364 moves in the direction of arrow A, thereby releasing the first engaging part 364 to be engaged with the first ring gear 363, so that the first L-shaped rod 362 is rotatable around the second rotating shaft the bolt 322, so that the rotating arm 33 can also rotate around the second rotating shaft the bolt 322. When the rotating arm 33 is rotated to a proper position, the first handle 361 is released to reset due to the resilient force, so that the first engaging part 364 is re-engaged with the gear on the first ring gear 363 to lock the first L-shaped rod 362, thereby locking the first L-shaped rod 362, so that the rotating arm 33 is locked. Therefore, the rotation of the rotating arm 33 around the second rotating shaft the bolt 322 can be controlled by the first adjustment handle 36.

Similarly, the second adjustment handle 37 has the second handle 371, the second L-shaped rod 372, the second ring gear 373 and the second engaging part 374. The second ring gear 373 has gears in a partial sector area, and is sleeved on the fourth rotating shaft the bolt 391 through the central through hole. And the second ring gear part 373 is fixedly connected with one end of the fixing block 365 through the second L-shaped rod 372. The second handle 371 is fixedly connected to the second engaging part 374 through its downwardly extending longitudinal rod 375. The second engaging part 374 can be engaged with a gear on the second ring gear 373.

In the normal state, when the second engaging part 374 is engaged with the gear on the second ring gear 373, the second connector 34 can not rotate around the fourth rotating shaft the bolt 391 because the longitudinal rod 375 is locked. When the armrest panel 35 is pushed toward the second handle 371 at horizontal direction, the thrust force acts on the second engaging part 374 through the longitudinal rod 375 to move the second engaging part 374 toward the direction of arrow B, thereby releasing the engagement between the second engaging part 374 and the gears on the second ring gear 373, thus enables the longitudinal rod 375 to rotate around the fourth rotating shaft the bolt 391, thereby enabling the second connector 34 to also rotate around the fourth rotating shaft the bolt 391. When the second connector 34 is rotated to a proper position, the second handle 371 is released to reset due to the resilience, so that the second engaging part 374 and the gear on the second ring gear 373 are re-engaged to lock the longitudinal rod 375, so that the armrest panel 35 is locked. Thus, the rotation of the armrest panel 35 around the second rotating shaft the bolt 322 can be controlled by the second adjustment handle 37.

Similarly, the third adjustment button 38 has a button part 381, a rod engaging part 382 extending horizontally from the button part 381, and an inline gear part 395. One end of the rod engaging part 382 can be engaged with a gear on the inline gear part 395. The end of the inline gear part 395 is also fixedly connected with the support piece 393 on the armrest panel base 39. The third adjustment button 38 is basically disposed in the housing of the armrest panel 35, and only the button part 381 is exposed from the side opening of the housing of the armrest panel 35 to facilitate the user to perform adjustment operations. In a normal state, when the rod engaging part 382 is engaged with the gear on the inline gear part 395, the armrest panel 35 is locked, and when the button part 381 of the third adjusting button 38 is pressed horizontally toward the armrest panel 35, the rod engaging part 382 is released open from the gear, and the armrest panel 35 can slide in the front-rear direction. When the armrest panel 35 is slid to a proper position, release the button part 381 so it is reset due to the resilience, and the rod engaging part 382 re-engages with the gears on the inline gear part 395 to lock the armrest panel 35. Thereby, the back-and-forth sliding of the armrest panel 35 can be controlled by the third adjustment button 38.

However, those skilled in the art should realize that the above embodiments are only used to illustrate the present invention, not to limit the present invention. Variations and modifications of the examples will fall within the scope of the claims of the present invention.

The invention claimed is:

1. A gaming chair with a rotatable holder, comprising:
   a backrest;
   a seat;
   two armrests;
   a bracket; and
   the rotatable holder;
   wherein each of the armrests further comprises: an armrest fixing arm, a first connector, a rotating arm, a second connector, an armrest panel, a first adjustment handle attached to the armrest panel, and a second adjustment handle attached to the armrest panel;

wherein one end of the armrest fixing arm is fixedly connected with a back of the backrest, and the other end of the armrest fixing arm is rotatably connected with one end of the rotating arm through the first connector, and the rotating arm is rotatable around a first rotating shaft bolt and a second rotating shaft bolt;

the other end of the rotating arm is rotatably connected with one end of the second connector, and the second connector is rotatable around a third rotating shaft bolt;

the other end of the second connector is rotatably connected to the armrest panel through a base of the armrest panel, and the armrest panel is rotatable around a fourth rotating shaft bolt; and the armrest panel is movable back and forth;

wherein the armrest panel further comprises an adjustment button, wherein the first adjustment handle is used to adjust the rotating arm rotating around the first rotating shaft bolt and the second rotating shaft bolt, the second adjustment handle is used to adjust the armrest panel to rotate around the fourth rotating shaft bolt, and the adjustment button is used to adjust a front and rear movement of the armrest panel; and wherein the rotatable holder further comprises a holder fixing arm, a vertical column, first cantilever, a second cantilever, and a clamping unit, wherein:

one end of the holder fixing arm is fixedly connected to the bottom of the seat of the gaming chair, and the other end of the holder fixing arm is fixedly connected to the vertical column;

one end of the first cantilever is rotatably connected to the vertical column through a sliding locking shaft, and the other end of the first cantilever is rotatably connected to one end of the second cantilever;

the other end of the second cantilever is rotatably connected to the clamping unit through a rotating support, and the clamping unit is used for clamping a mobile device.

2. The gaming chair with a rotatable holder according to claim 1, wherein the sliding locking shaft is configured as a sleeve and a cylindrical shaft radially protruding from the side wall of the sleeve, the sleeve is disposed on and can slide along the vertical column.

3. The gaming chair with a rotatable holder according to claim 2, wherein a limiter is also sleeved on the vertical column, and the limiter is located under the sleeve of the sliding locking shaft to limit the sliding position of the sliding locking shaft along the vertical column.

4. The gaming chair with a rotatable holder according to claim 3, further comprising a swivel base, wherein the swivel base comprises:

a first hinged support and a second hinged support, wherein the first hinged support is fixed on the clamping unit and has a first through hole, and the second hinged support is rotatably connected with the other end of the second cantilever and has a second through hole;

a hinge shaft passes through the first through hole and the second through hole, causing the clamping unit to rotate around the hinge shaft with respect to the second hinged support.

5. The gaming chair with a rotatable holder according to claim 4, wherein one end of the first cantilever is also rotatably connected to the cylindrical shaft of the sliding locking shaft.

6. The gaming chair with a rotatable holder according to claim 5, wherein between one end of the first cantilever and the cylindrical shaft of the sliding locking shaft, between the other end of the first cantilever and one end of the second cantilever and between the other end of the second cantilever and the rotating support are all rotatably connected by fastening bolts and damping blocks.

7. The gaming chair with a rotatable holder according to claim 1, wherein the mobile devices one of a smart phone, a tablet computers, or a handheld game console.

8. The gaming chair with a rotatable holder according to claim 1, wherein the first adjustment handle, the second adjustment handle, and the adjustment button are disposed in a housing of the armrest panel, and wherein a first handle part of the first adjustment handle, a second handle part of the second adjustment handle, and a button part of the adjustment button are exposed from openings of the housing for adjustment operations by a user.

9. A gaming chair with a rotatable holder, comprising:
a backrest;
a seat;
two armrests;
a bracket; and
the rotatable holder;

wherein each of the armrests further comprises: an armrest fixing arm, a first connector, a rotating arm, a second connector, an armrest panel, a first adjustment handle attached to the armrest panel, a second adjustment handle attached to the armrest panel, a first L-shaped rod, and a second L-shaped rod;

wherein the first L-shaped rod includes a first ring gear part, and the first L-shaped rod connects the armrest panel to the first connector and allows a user to lock the first connector from rotating by locking the first ring gear part with the first adjustment handle attached to the armrest panel;

wherein the second L-shaped rod includes a second ring gear part, and the second L-shaped rod connects the armrest panel to the second connector and allows the user to lock the second connector from rotating by locking the second ring gear part with the second adjustment handle attached to the armrest panel; and wherein the rotatable holder further comprises a holder fixing arm, a vertical column, first cantilever, a second cantilever, and a clamping unit, wherein:

one end of the holder fixing arm is fixedly connected to the bottom of the seat of the gaming chair, and the other end of the holder fixing arm is fixedly connected to the vertical column;

one end of the first cantilever is rotatably connected to the vertical column through a sliding locking shaft, and the other end of the first cantilever is rotatably connected to one end of the second cantilever;

the other end of the second cantilever is rotatably connected to the clamping unit through a rotating support, and the clamping unit is used for clamping a mobile device of the user.

* * * * *